United States Patent [19]

Stoynoff, Jr.

[11] Patent Number: 5,664,450
[45] Date of Patent: Sep. 9, 1997

[54] SELF-DISPERSING FACILITATING FLUID FORMING ROLL

[75] Inventor: Richard P. Stoynoff, Jr., Woodhaven, Mich.

[73] Assignee: Livernois Research & Development Company, Dearborn, Mich.

[21] Appl. No.: 708,831

[22] Filed: Sep. 9, 1996

[51] Int. Cl.$^6$ .......................... B21B 45/02; B21B 27/06; B21B 28/00; B21C 37/02
[52] U.S. Cl. .................... 72/44; 72/236; 72/43; 72/379.6
[58] Field of Search .................... 72/43, 44, 46, 72/179, 180, 181, 379.6, 379.2, 463, 236; 492/1, 30, 46; 29/6.1

[56] References Cited

U.S. PATENT DOCUMENTS 4,067,219  1/1978  Bianchi .
4,118,964  10/1978  Fusco .......................................... 72/43
4,507,948  4/1985  Wallis .
5,007,270  4/1991  Wallis .................................. 72/379.6

OTHER PUBLICATIONS

*Heat Exchanger Manufacturing Equipment*, Livernois Engineering Co., Mar. 1989 [Technical Bulletin].

*Primary Examiner*—Lowell A. Larson
*Assistant Examiner*—Rodney A. Butler
*Attorney, Agent, or Firm*—Brooks & Kushman P.C.

[57] ABSTRACT

A method and apparatus for manufacturing resilient, deformable serpentine products including a pair of form rolls (10, 12). The form rolls (10, 12) are generally circular in shape and include a plurality of intermeshing blades (56). The blades (56) have a plurality of teeth (62) each including a peak (70), a valley (74), and a central hollow region (64) that receives a shaft (90) for transferring a fluid thereto. The fluid is then conveyed from the shaft (90) through a plurality of grooves (80) on the surface of the blades (56). In one embodiment, the fluid is to aid in the forming process.

21 Claims, 5 Drawing Sheets

SELF-DISPERSING FACILITATING FLUID FORMING ROLL

TECHNICAL FIELD

The present invention relates to a method and apparatus for delivering a facilitating fluid to a roll forming tool. More specifically, the present invention relates to an internal facilitating fluid dispersing forming roll that is used in the manufacture of a deformable, resilient product such as a louvered serpentine heat exchange fin.

BACKGROUND ART

It is known that fluids, such as lubricants, may usefully be applied to any tool during a roll forming process. This is particularly true when the forming process requires the formation of intricate shapes, slits, or bumps, on parts or when parts are being manufactured that may have a tendency to adhere to the forming tool. A primary reason for the use of lubrication during the forming process is to prolong tool life. However, several other reasons exist. For example, the presence of lubricants improves the stability and consistency of the parts being formed. This is particularly true when the parts being formed are sinusoidal in nature. Illustrative of the prior art is the disclosure of U.S. Pat. No. 4,507,948, issued to Wallis on Apr. 2, 1995.

During the roll forming process, a lubricant, generally in the form of a liquid or mist, is either wiped onto (the "wipe-on-strip" method), dripped onto (the "drip-on" method), or blown onto (the "spray-on" method) a virgin strip before or during the formation process. These methods of lubrication are also sometimes applied directly to the forming tool. These prior methods all have disadvantages because the lubricant is always applied by some type of external device in imprecise quantities with the attendant problems of waste and possible environmental harm.

The "wipe-on-strip" method is disadvantageous because it is usually applied to the virgin strip by felt, or another porous material pad. Porous materials have a fast breakdown rate and become easily clogged with dust or debris from the virgin material. Unless the pad is changed frequently, built-up contaminants on the pad can eventually be transferred into the forming tool. This combination can cause a machine wrap-up or machine shut-down. Additionally, when the wipe-on-strip method is used, there is no way of reclaiming all the lubricant as some of it soaks into the pad.

The "drip-on" method is disadvantageous because it generally results in either uneven lubrication or excessive strip lubrication. Typically, when lubricant is applied via the "drip-on" method, excess lubrication can result. While insufficient lubrication tends to cause machine wrap-ups and production loss, the drawback from excessive lubrication is lubrication waste. Even if an attempt is made to recycle the lubricant, an expensive filtering process must be employed. The utilization of a filtering process requires production down time while routine maintenance is performed on the system and thus, the loss of valuable manufacturing time.

The "spray-on" or atomizer method uses the least amount of lubricant. The lubricant is mixed with air, then sprayed on the strip or tool. The drawback to this method is that the lubricant becomes airborne when it is sprayed onto the strip or tool and is extremely difficult and expensive to reclaim. If the lubricant is sprayed onto the strip, and evaporative lubricants are used, the spray device has to be very close to the strip. If the spray device is located too far from the strip, the lubricant will evaporate while being sprayed and thus before the forming process takes place. Generally, when the spray device is used to directly lubricate the forming tool, the tool is rotating at speeds approaching 1000 RPM. In this case, the forming tool typically acts as a fan and either blows most of the lubricant away from the material and tool, or prematurely evaporates the lubricant.

Environmental issues have now become as important in the industry as the economic considerations mentioned above. Accordingly, any process that can also reduce the loss of or use of oils or lubricants and still maintain production quality would be a significant advantage. One process that addresses both of these considerations is roll forming. Current roll forming processes are also an improvement over prior systems environmentally. However, current roll forming processes still raise some environmental concerns, such as in the area of lubrication use and reclamation. By way of example, the heat exchanger industry spends millions of dollars each year on expensive roll forming lubricants which cannot be economically recycled or reclaimed. These lubricants are necessarily used in the production of every radiator, evaporator, condenser, and heater core used in every automobile. These lubricants are also used in every home air conditioner and device that is produced by roll-forming.

Accordingly, the amount and efficient distribution of fluids, such as lubricants, that are used in the forming process raise major environmental concerns for a heat exchanger manufacturer, especially during the bonding process of the heat exchanger fin to a heat exchanger tube. If extremely small traces of fluid residue remain on either component, the bonding process can become compromised. This not only reduces the effective heat exchange properties of the core, but can also cause premature failures and leaks. The manufacturer thus must wash the component before bonding to avoid these premature failures and leaks. Many washers chemically emulsify the fluids such as lubricants to remove them, thus producing environmentally unfriendly waste contaminants, the disposal of which is expensive. The evaporative type of lubricants help to alleviate this process, but they are expensive.

SUMMARY OF THE INVENTION

Applicant has recognized that a less expensive method of dispensing, reclaiming, and disposing of fluids such as lubricants during the manufacture of louvered serpentine fins without creating environmental problems while still maintaining production quality would be beneficial.

It is an object of the present invention to provide a method and apparatus for the internal distribution of fluid to a forming roll that is used in the manufacture of products such as louvered serpentine fins and springs that are designed to overcome the aforementioned disadvantages. For example, the apparatus for internally distributing fluid to the forming roll of the present invention requires less fluid than was required with prior apparatus that distributed fluid externally to form rolls.

In accordance with this and other objects of the present invention, the disclosed form roll includes a pair of rotatable wheel assemblies. Each wheel assembly has a plurality of form blades that each have a plurality of teeth spaced about its periphery that intermesh with the teeth of the other wheel assembly to cut, roll, and form a serpentine product from a workpiece inserted therebetween. Each blade also has a hollow inner region. Each of the teeth has a peak and a valley with a cutting surface lying between each peak and each valley. Located in each valley is an opening that leads to a passageway extending into communication with the hollow inner region. The hollow inner region is provided with a facilitating fluid from a piping assembly. The facilitating fluid is forced through each cutting surface to aid in the forming of a resilient, deformable product such as a louvered serpentine fin or a spring.

It is an additional object of the present invention to provide a method of internally distributing fluid to a form roll that is used to manufacture serpentine products. In accordance with the disclosed method, a facilitating fluid is pumped from a fluid storage tank to a valving arrangement. Compressed air is also pumped to the same valving arrangement such that the fluid-air mixture is transferred to an upper form roll and to a lower form roll through a rotating shaft. Each form roll has a central hollow region that receives the drive shaft. As the drive shaft rotates within central hollow region, the fluid-air mixture travels through passages in the blades and into contact with the blade forming surface or the workpiece.

Additional features and advantages of the present invention will become apparent to one of skill in the art upon consideration of the following detailed description of the present invention.

BRIEF DESCRIPTION OF THE DRAWINGS

A preferred embodiment of the present invention is described by reference to the following drawings.

DETAILED DESCRIPTION OF THE PREFERRED EMBODIMENT

Figure 1:
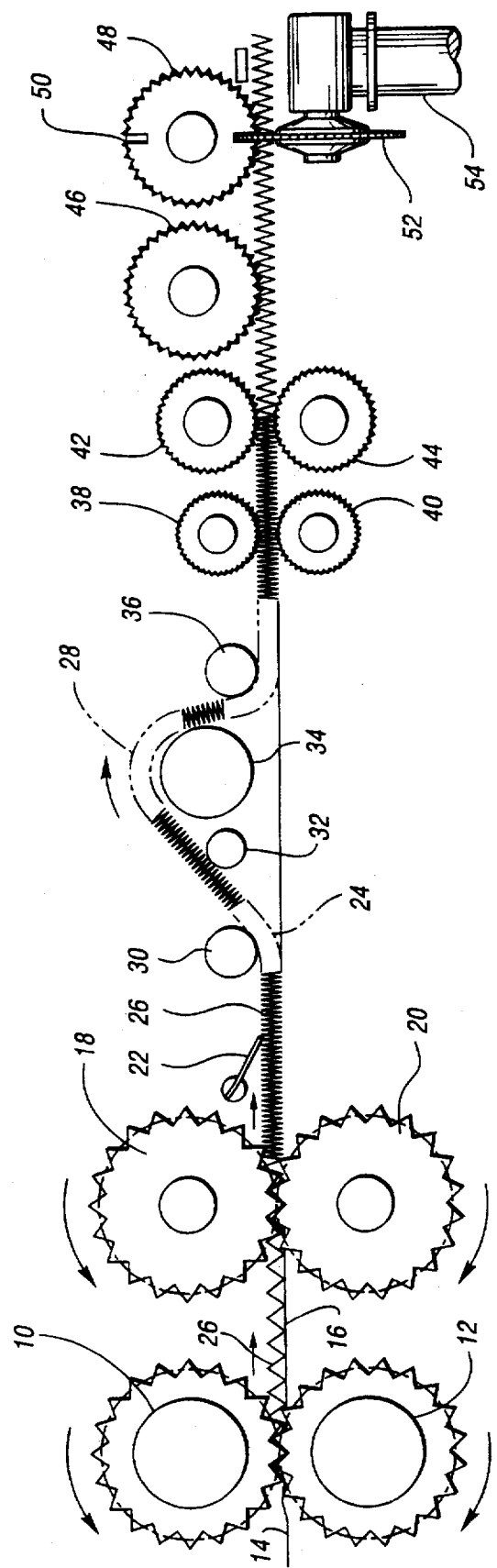
FIG. 1 is an elevational view of an apparatus for forming corrugated strips and cutting them to length.

Referring to FIG. 1, there is illustrated a corrugated fin rolling machine, several features of which are conventional. The machine includes a pair of form rolls 10, 12 mounted on the frame of the machine and in intermeshing relation, as illustrated.

Before disclosing the invention in further detail, there now follows a summary of its environment. Sheet metal ribbon stock 14 or any other suitable workpiece such as a resilient, deformable strip, perhaps made of plastic, is fed from a supply thereof, such as a coil (not illustrated) between form rolls 10 and 12 so as to form corrugations therein. The corrugated strip is designated 16 and is optionally directed from rolls 10, 12 downstream to a pair of gathering rolls 18, 20 which advance the corrugated strip 16 to a spring pressure plate or friction pad 22. The pressure plate 22 cooperates with a bottom supporting rail 24 on which the corrugated strip 16 is advanced to frictionally retard the forward movement of the corrugated strip so that it is compacted or compressed lengthwise by further bending at the crests 26 of the convolutions. It will be observed that the crests 26 of the corrugated strip are spaced much closer together in the section of the strip downstream of the rolls 18, 20 and spring plate 22 than other corrugations of the section of the strip 16 between form rolls 10, 12 and gathering rolls 18, 20.

After the strip 16 is fed forwardly past spring plate 22, it is advanced around idle rolls 30, 32, 34, and 36 to form a take up loop or humping station 28. The provision of this loop 28 is desirable since the upstream rollers 10, 12 and 18, 20 are rotated continuously, while the rolls downstream from roll 36 are operated intermittently. Thus, the loop 28 increases in size when rotation of the downstream rolls is arrested and then becomes progressively smaller when rotation of the downstream rolls is resumed. Since loop 28 freely expands and contracts in size, it follows that the corrugated strip 16 is neither stretched nor compressed as it advances through the loop. Thus, the crest spacing in this section of the strip remains relatively constant and is substantially the same as produced by the action of spring plate 22.

Downstream from roll 36, there is arranged a pair of tooth feed rollers 38, 40 spaced vertically apart so that the teeth on the upper roll 38 engage between the successive upper crests of the corrugated strip 16 and the teeth on the lower roll 40 engage between the successive lower crests on the corrugated strip 16. The pitch of the teeth on rolls 38, 40 corresponds generally with the spacing between the successive crests on the section of corrugated strip between the spring plate 22 and the rolls 38, 40.

At a location spaced downstream from rolls 38, 40 there is optionally arranged a second pair of rolls 42, 44 which are also spaced vertically to engage between the successive upper and lower crests of the corrugated strip in the same manner as the teeth of rolls 38, 40. An additional roll 46 may be optionally located downstream in the path of travel of the corrugated strip 16 from rolls 42, 44. The roll 46 is supported above the strip so that the teeth thereof engage between the top crests of the strip 16 advancing on rail 24. Downstream from the roll 46, there is optionally journalled a further toothed roll 48. The roll 48 is formed with a pair of diametrically opposite slots 50 for accommodating a means for cutting, such as a saw blade 52 that is vertically reciprocated intermittently by a cylinder 54 or other suitable means to cut the strip 16 to the appropriate lengths.

Within the environment described above, the present invention is related to the forming rolls 10, 12 and the delivery of a facilitating fluid, such as a lubricant, thereto. The forming rolls are also commercially referred to as fin rolls when used for making heat exchanger fins. The facilitating fluid includes any conventional lubricant, such as oil, hot or cold gas, hot or cold air, a powder, a hot or cold fluid, or the like. The facilitating fluid may also include a layer for finishing the workpiece such as a varnish or a rust or corrosion preventor. However, the terms fluid and lubricant are used interchangeably herein. Either the forming rolls 10, 12 or the work piece 14 or both must be lubricated so that the strip 16 can be cut, rolled, and formed into the desired shape.

Figure 3:
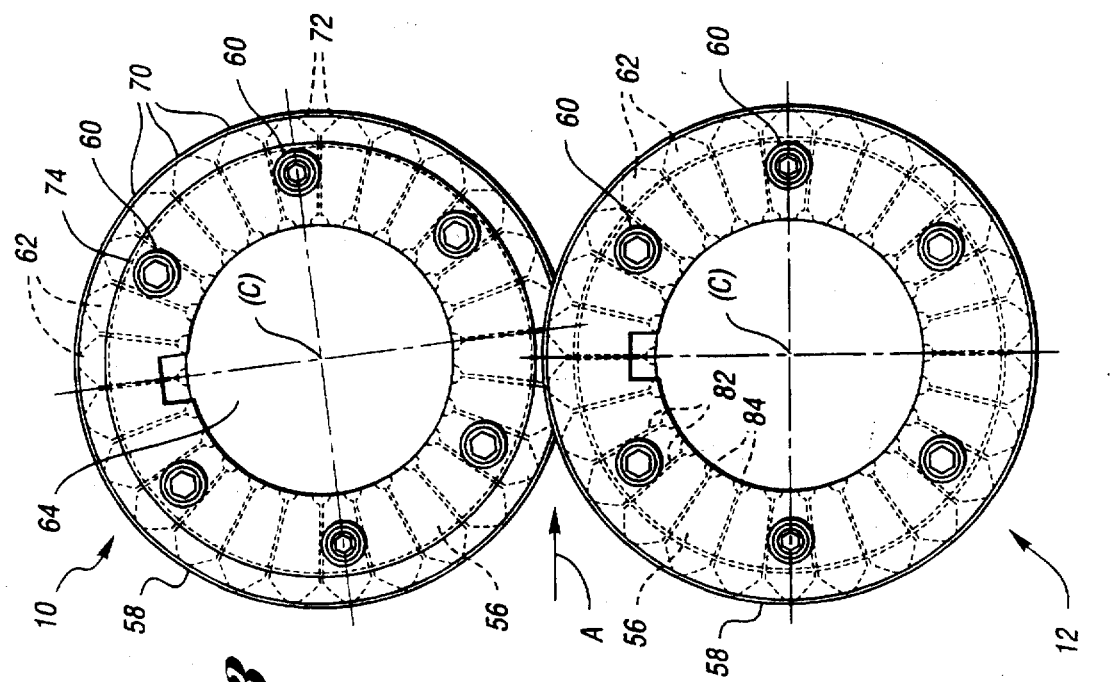
FIG. 3 is a side view of a roll forming tool in accordance with a preferred embodiment of the present invention.
Figure 2:
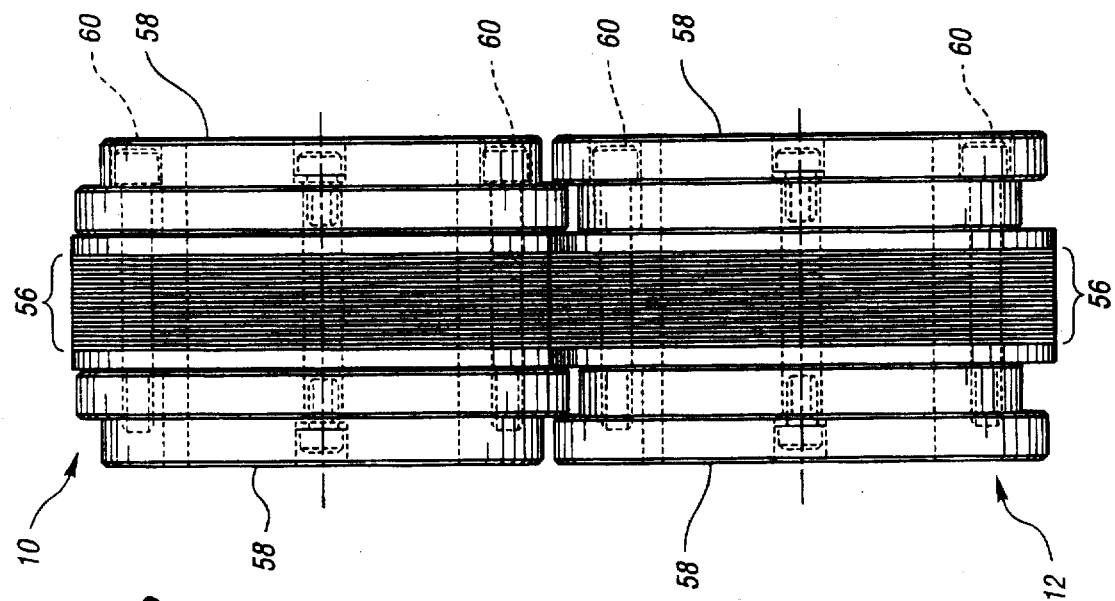
FIG. 2 is a top plan view of a roll forming tool in accordance with a preferred embodiment of the present invention.

FIGS. 2 and 3 illustrate in more detail the forming rolls 10, 12 and their internal fluid delivery means in accordance with a preferred embodiment of the present invention. The forming rolls 10, 12 are a pair of intermeshing wheel assemblies. Each of the forming rolls 10, 12 includes a plurality of star shaped blades 56 stacked upon one another. The star shaped blades 56 of the roll 10 are located such that they intermesh with the star shaped blades 56 of the roll 12. The blades 56 of each wheel assembly 10, 12 are preferably sandwiched between and secured by a pair of end plates 58. The end plates 58 are secured to the other blades 56 and the opposing end plate 58 by a plurality of fasteners 60, such as a bolt or the like which extend through a plurality of passageways in the blades 56. Each wheel assembly 10, 12 rotates around its center axis or center point (C) (FIG. 3) such that the fin blades 56 mate, cut, and roll a workpiece such as a piece of metal, inserted between the two wheel assemblies, as shown by the arrow A in FIG. 3.

Figure 4:
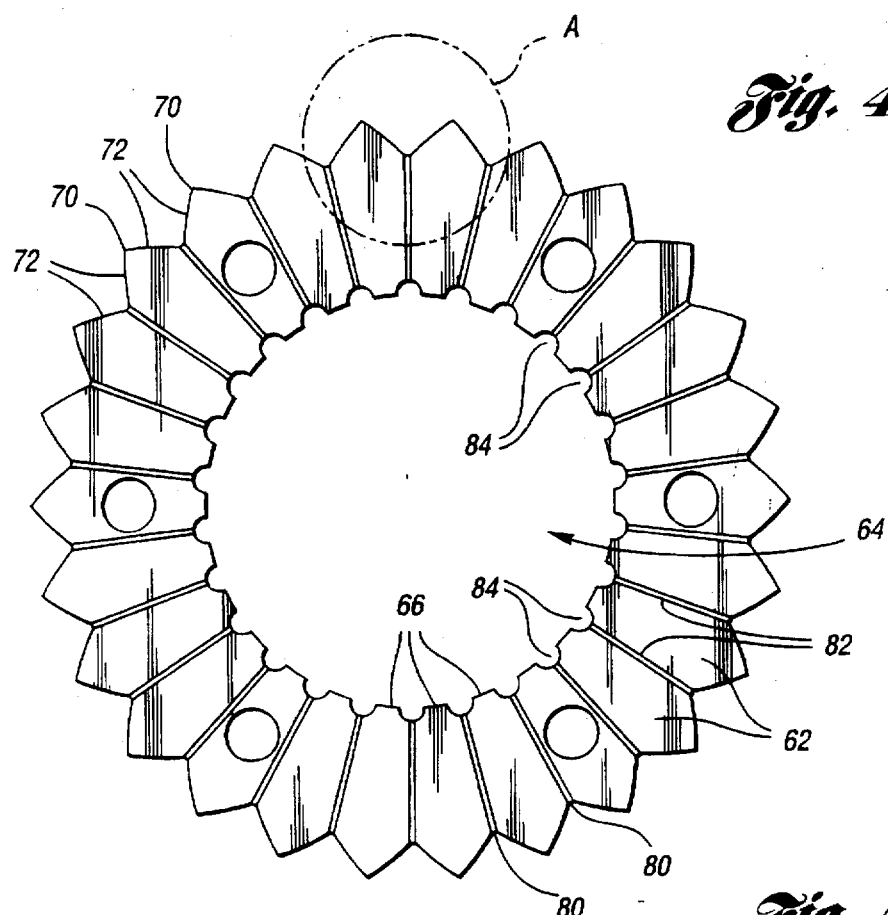
FIG. 4 is a side view of a roll forming tool blade in accordance with a preferred embodiment of the present invention.

As shown in FIGS. 3 and 4, each blade 56 includes a plurality of teeth 62 formed in its outer surface. The teeth 62 are preferably uniformly spaced about the periphery of the blade 56. The teeth 62, however, may be located in any pattern about the periphery of the blade 56 depending upon the design of the product to be formed.

Figure 5:
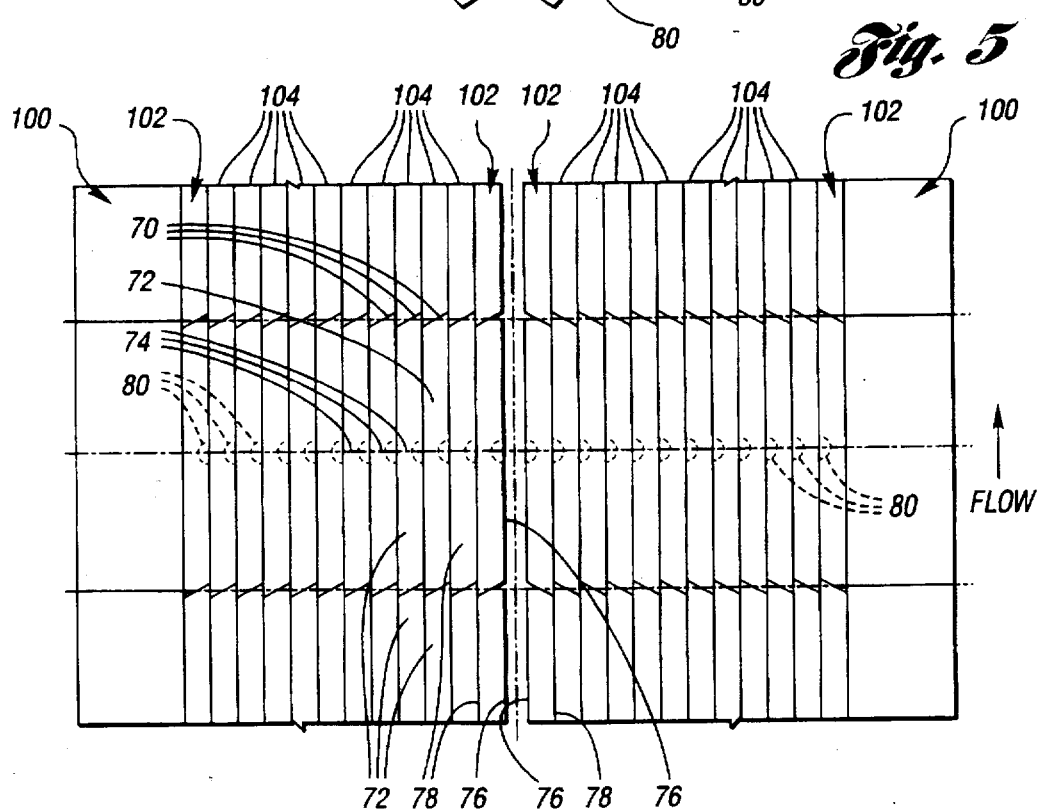
FIG. 5 is a projection of a portion of the blades of the roll forming tool bordered by the rectangle in FIG. 2 in accordance with a preferred embodiment of the present invention.

The blade 56 has a central hollow region 64 with its outer periphery defined by the inner side 66 of each of the teeth 62. Each end plate 58 has a corresponding opening 68 formed therein which is preferably sized to match the size of the central hollow region 64. Each tooth 62 preferably includes a peak 70 and a pair of forming surfaces 72 that extend generally inwardly from the peak 70. Each forming surface 72 ends in a valley 74 that is formed by two forming surfaces 72 that extend generally outwardly from each valley 74. Each forming surface 72 has a pair of peripheral flanks 76, 78 located on either side of the forming surface 72 (FIG. 5). The forming surface 72, is primarily responsible for the cutting, rolling, and forming of the deformable resilient serpentine product.

Each valley 74 has a groove 80 formed therein that is connected to a respective passageway 82 formed in the fin blade 50. Each passageway 82 is connected to the central hollow region 64 of the blade 56 by an opening 84 so that each groove 80 is in fluid communication with the central hollow region 64. The opening 84 to each passageway 82 is preferably shaped like a half circle or a half moon. The central hollow region 64 of the blade 56 receives facilitating fluid from a plumbing assembly 86, described in more detail below. The facilitating fluid is forced through the half moon shaped openings 84 through the passageway 82, out the grooves 80 and into intimate contact with the forming surfaces 72 and/or the workpiece to aid in the bending, cutting, and forming of the strip 16.

In the preferred embodiment, the geometric configuration of these form rolls 10, 12 allows a facilitating fluid, including a coolant, lubricant, air, or any other fluid or fine powder to be delivered into the central hollow region 64 of each form roll 10, 12 and then expelled directly onto the forming surfaces 72 and/or the workpiece being formed. As discussed below, the facilitating fluid is expelled at the appropriate time and in the amount required at the exact time it is required.

Figure 6:
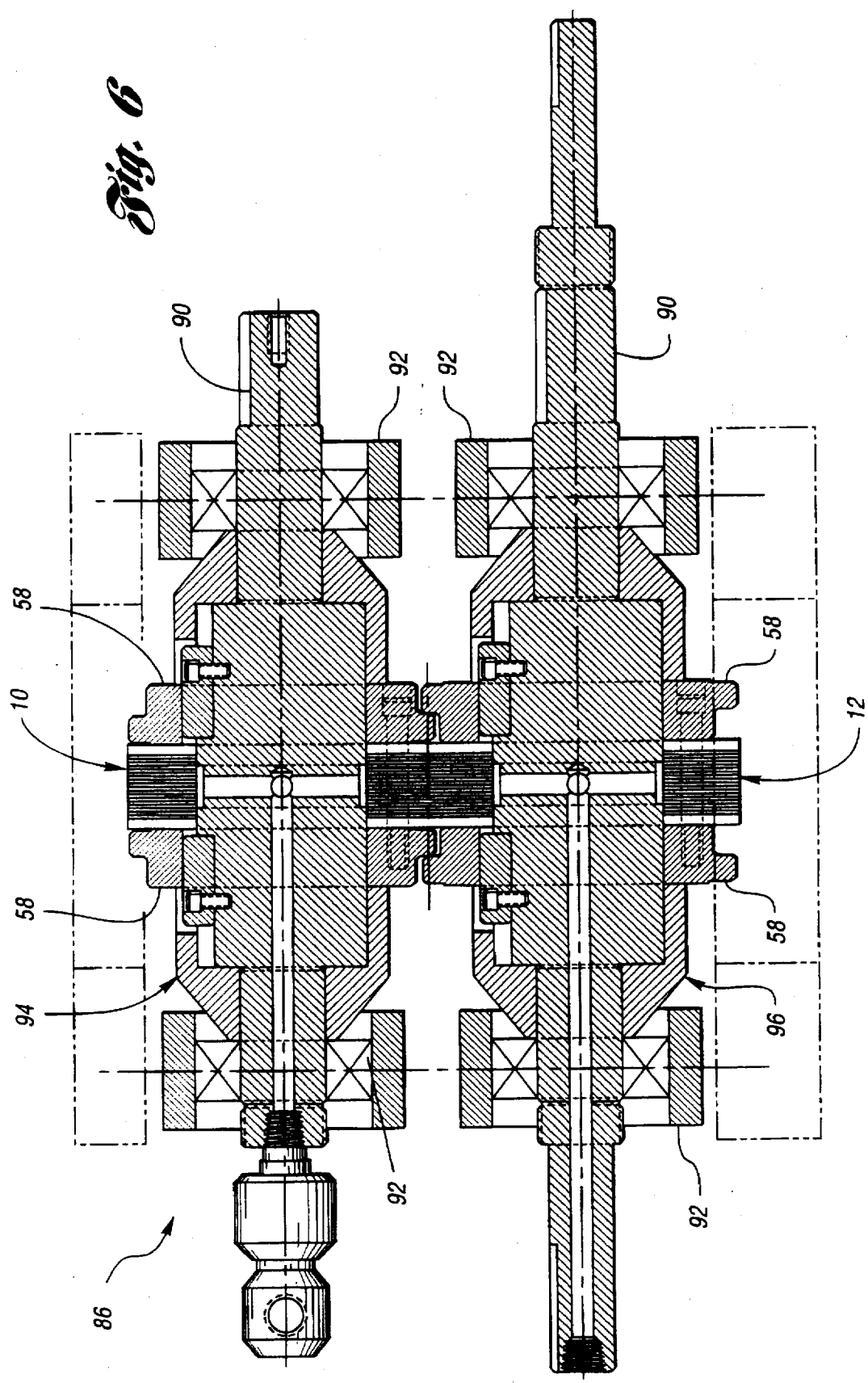
FIG. 6 is a cross-sectional schematic view of the roll forming tool in accordance with a preferred embodiment of the present invention.

As shown in FIG. 6, each form roll 10, 12 is preferably mounted tightly to a specially designed shaft 90 which revolves in a matched set of bearing blocks 92. Alternatively, the shaft 90 can be fixed and the form rolls 10, 12 will revolve about the stationary shaft 90. This would eliminate the need for the swivel fitting 94 located at the end of each shaft. It would also allow for a baffle to be inserted into the shaft 90 which would allow only certain passages to communicate with the outer periphery of the tool. The baffle preferably only allows facilitating fluid to be expelled to the passage leading to the forming surfaces 72 that are contacting the workpiece and some surrounding passages in advance of, or during contact.

The shaft preferably rotates in the bearings 92 with respect to the rolls 10, 12. This configuration has the advantage of maintaining replacement adaptability and compatibility with the majority of existing commercially available form roll mounting devices. As shown in FIG. 5, the grooves 80 located in the valley 74 of each fin blade 62 allow facilitating fluid to escape from the plumbing assembly 86 and into contact with the workpiece 14. The grooves 80 are shown formed on one peripheral edge 76. Alternatively, the grooves 80 can be formed on the other peripheral edge 78 or both edges 76, 78 or any combination thereof. The grooves 80 receive facilitating fluid from a respective passageway 82 formed in the blade 62 as permitted by the arrangement of the baffle. The passageways 82 open onto the periphery of the center hollow region 62 through openings 84 formed in the inner side 66 of the teeth.

The shape of the grooves 80 is one of convenience and can vary in size and location depending on facilitating fluid requirements of the stock strip and/or the tool. The shape of the openings 84 can also vary the facilitating fluid requirements of the stock strip and/or the tool. While the size and shape of the grooves 80 can change, what is important is that grooves 80 are present in one or more valleys 74 or one or more forming surfaces 72, or one or more peaks 70 of one or more blades 56 or components making up the finished tool. It is not necessary for "every" blade of the plurality of blades that form a roll 10, 12 to have grooves.

In an alternative embodiment, the grooves 80 can be formed in every other valley 74, in every third valley 74 or any other configuration of valleys Additionally, the grooves 80 need not be formed in the tooth valley 74, they can alternatively open onto the forming surface 72, or the peaks 70. The passages 82 only need to open at the source of the facilitating fluid in the central hollow region 64 and exit at an appropriate place on the outer periphery of the blade 62. The number of openings 84 can also be variable.

The main function of the grooves 80 is to provide a passage for strip and/or tool facilitating fluid. However, the grooves 80 may also be used for other purposes. For example, one such purpose would be to aid in the stripping of a formed part. In this application, air, gas and/or liquid escaping from these passages would create a positive pressure on the material being formed and aid in the stripping off of the part from the tool. Alternatively, air, gas and/or liquid can be used to cool the part being formed if heat buildup during the forming process is a problem. Additionally, these grooves 80 and passages 82 can be used to heat the tool or strip material during the forming process if hot forming is required. Moreover, air, gas and/or liquid pumped under pressure through these passages can be used to blow off facilitating fluid if a pre-lubrication device is used. Negative pressure or a vacuum could also be attached to the tool to aid in the recovery of facilitating fluid. Further, appropriate chemicals could be pumped through these passages to aid in dissolving the facilitating fluid if a pre-lubrication device is used, and/or washing off contaminates on the forming strip or tool or otherwise clear the tool.

Turning again to FIG. 6, the plumbing assembly referred to generally by reference number 86 is illustrated. This assembly 86 controls the flow of lubricant to the form rolls 10, 12. The facilitating fluid is stored in a fluid storage container or the like (not shown). The fluid storage container is connected by a conduit to a valve (not shown) so that the facilitating fluid can flow thereto. Air or other gas which is taken from a different source is preferably passed through a compressor through a separate conduit and to the valve. The valve is preferably a twist valve or a needle valve. However, any other commercially available valve is contemplated.

In the preferred embodiment, the twist valve is manually actuated to allow the fluid-air mixture to be forced to a manifold which directs the fluid-air mixture to the top assembly 94 for the form roll 10 and also to the bottom assembly 96 for the form roll 12. In one embodiment, the valve is manually operated such that the appropriate amount of facilitating fluid is passed to the rolls 10, 12 at the appropriate time. The upper and lower shafts 90 have passageways 100 formed therethrough for conveying the fluid-air mixture to the form rolls 10, 12. The passageways 100 convey the mixture to the central hollow region 64 where the mixture is then forced through the openings 84 and ultimately out the grooves 80 into contact with the tool or the workpiece. The baffle directs the flow of fluid through the appropriate passageways 82.

Alternatively, the valve can be automatically controlled. In the automated embodiment, the information regarding the type of strip to be formed is input into a computer and then the computer controls activation of the valve and thus the amount of fluid that is necessary. Other information may alternatively be input and controlled, including the amount of fluid to be dispensed.

In another embodiment, a fluid distributor is included which is in fluid communication with the fluid storage tank. The fluid distributor controls the amount of fluid that flows from the tank. The fluid distributor is a computer controlled gate that provides for the selective distribution of fluid to the forming surface in advance of contact by the forming surface with the workpiece.

The distribution preferably includes a sensing means for sensing the location of each opening 84 and groove 80 with respect to the workpiece so that facilitating fluid can be properly dispersed. This type of control or feedback loop is well known in the art. The facilitator also preferably includes a mixing means for mixing the fluid and air to provide the rolls 10 and 12 with the desired fluid-air mixture. The mixing ratios are also computer-controlled so that the desired fluid-air mix is obtained.

Figure 7:
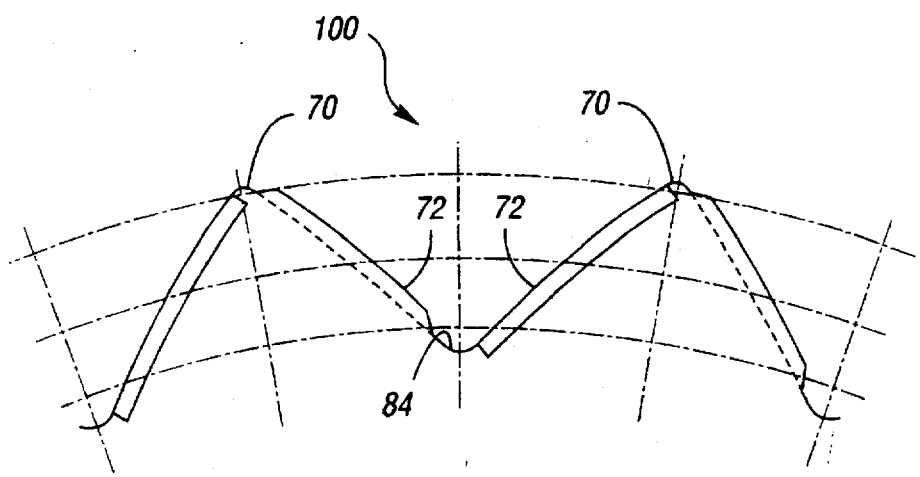
FIG. 7 is a sectional view of an alternative embodiment of the roll forming tool taken from section A in FIG. 6.
Figure 8:
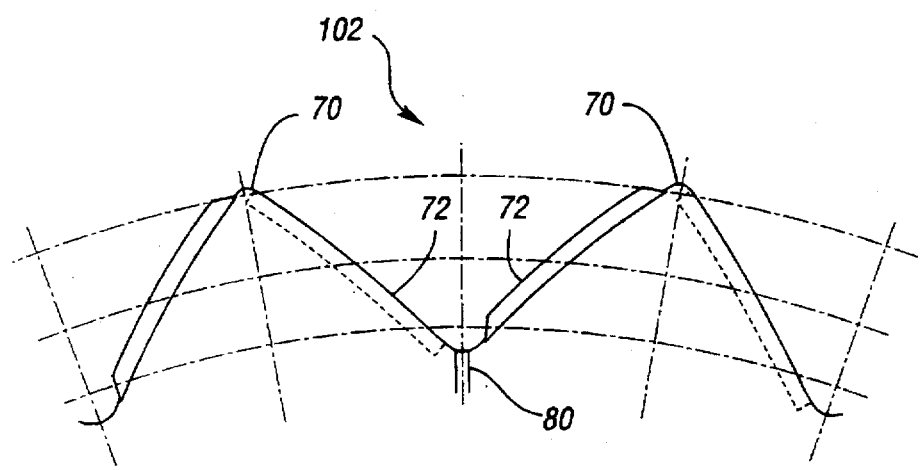
FIG. 8 is a sectional view of a second embodiment of the roll forming tool taken from section A in FIG. 6.
Figure 9:
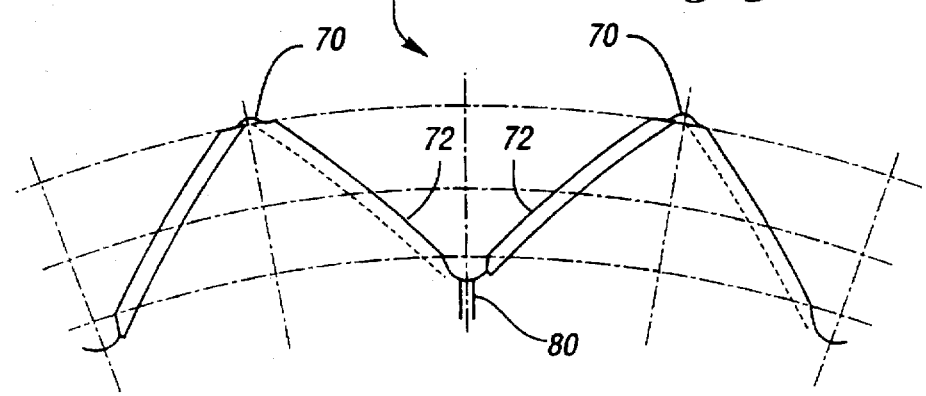
FIG. 9 is a sectional view of a third embodiment of the roll forming tool taken from section A in FIG. 6.

FIGS. 7 through 9 are examples of alternative form blades and their respective forming surfaces in accordance with the present invention. FIGS. 7 through 9 illustrate a portion of a forming blade 56, having two teeth 64, having a peak 70, a valley 74 and a forming surface 72. FIG. 7 is an illustration of a border forming blade. A border forming blade is preferably included in the rolls 10, 12 of the present invention. The border blade is positioned in the form roll such that it cuts and forms the edge of the resilient deformable product and is preferably positioned at location 100 in FIG. 5. As the border blade does not do any appreciable cutting, there are no grooves in the valleys 74 to allow facilitating fluid therethrough. FIG. 8 is an illustration of a Hi-Lo form blade. The Hi-Lo blade is preferably located next to the end blades and forms the end louvers of the product. The Hi-Lo blade 102 includes a groove 80 for emitting the faciliting fluid onto the product and is designated 102 in FIG. 5. FIG. 9 is an illustration of a common form of blade which forms the majority of the louvers in the product. The common form blades are referred to by number 104 and preferably positioned as shown in FIG. 5.

The common form blade is similar to the Hi-Lo blade and helps form the product. As shown by FIGS. 8 and 9, the forming surfaces 72 of these two blades have different shapes. The cutting surface of the common blade is raised with respect to the forming surface 72 in FIG. 8. These cutting surfaces 72 can vary depending upon the angle of the product to be formed. Any combination of these known blades or other conventional blades may be utilized. The common form blades 104 also have raised cutting surface 72 like the Hi-Lo blade 102. The opposing forming surface 72 is also slightly raised with respect to the peak 70 and the valley 72.

The disclosed forming tool is designed to be fitted to almost all existing designs with a minimal amount of investment to the tool mounting shafts and current facilitating fluid plumbing. The cost of this adaptation is more than justified by the facilitating fluid savings that would be realized as discussed below.

EXAMPLES

To evaluate its performance, the disclosed internally fluid dispersing form roll was compared to prior externally lubricated form rolls. The comparison was between the prior spray method and the disclosed internally fluid dispersing roll. It showed that the disclosed internally fluid dispersing roll needed less fluid to operate properly than prior externally lubricated rolls. The tests revealed that the lubrication requirement had been decreased as much as 50%. Thus, the objective of reducing fluid requirements has been met.

This test was conducted by comparing the disclosed tool to the prior mist method of spray lubrication. This is the most current cost effective means of strip lubrication, is used widely as an industry standard, and uses the least amount of lubricant of the currently used lubrication methods.

The testing method was as follows. A regulator valve was installed on the lubricant line. A regulator valve was installed on a line feeding compressed air at 60 psi of pressure. These two lines were joined via a "Y" hook-up allowing a mixture of air/fluid to be attached to the swivel fitting on each shaft, thus allowing an infinite mixture of fluid/air to be tested.

Prior Spray Method

A standard air/oil nozzle was used and mounted in its best location to suit the lubrication process. The ratio of oil/air was reduced until the machine began experiencing problems making the fin (jam-ups). The oil/air ratio was increased in minute graduations until the machine was capable of maintaining fin stability. This mixture was considered as the minimum amount of lubricant that could be used to successfully manufacture a fin. The machine was run at 800 feet/minute of incoming virgin material (production speed) for two hours without stopping. Oil consumption was measured and 47.50 cubic inches of coolant had been used.

Disclosed Self-Lubricating Roll

The external lubricant sprayer was then disconnected and the new self-lubricating roll was adapted to the same lubrication and air lines via a special swivel fitting mounted in the end of the upper and lower roll support shafts. The minimum oil/air ratio was established by the exact same method as described above. Again, the roll was run for two hours and the oil consumption measured. Measurements show that 23.25 cubic inches of coolant had been used.

Not only was the measured difference in oil consumption less with the disclosed self-lubricating roll, but core bonding without having to wash the fin was accomplished and the tool remained visually cleaner than tools using an external lubrication device.

As another example, one installation has a standard lubrication method that uses 24,000 gallons of lubricant per year. The lubricant costs $3.00 per gallon and the installation thus spends $72,000 per year on lubricant. The installation has on average 14 machines running 52 weeks per year, 6 days a week, 20 hours per day which averages out to 0.275 gallons of lubricant per machine/per hour. In addition to the lubricant cost, the cost of washing the fin before bonding must also be included. If the new self-lubricating form roll was used instead at the same installation, the amount of lubricant used would average out at 0.051 gallons per machine/per hour and a total of 4,455 gallons per year. At the same lubricant cost, the use of the disclosed tool would yield a $58,000 savings per year and 19,545 gallons of lubricant would be saved per year. If 100 such plants existed worldwide, 1,954,500 gallons of lubricant could be saved.

While only one preferred embodiment of the invention has been described hereinabove, those of ordinary skill in the art will recognize that this embodiment may be modified and altered without departing from the central spirit and scope of the invention. Thus, the embodiment described hereinafter is to be considered in all respects as illustrative and not restrictive, the scope of the invention being indicated by the appended claims, rather than by the foregoing descriptions, and all changes, which come within the meaning and range and equivalency of the claims are intended to be embraced herein.

What is claimed is:

1. A tool for forming deformable, resilient, serpentine products comprising:
   a pair of rotatable forming rolls that define a forming area therebetween in a region of intermeshing contact;
   a plurality of blades included in each of said forming rolls, each of said blades having a hollow inner region;
   one or more of said blades having a plurality of teeth spaced about its periphery, one or more of said plurality of teeth having a peak, a valley, and a forming surface lying therebetween;
   said valley having a groove formed therein, said groove being in communication with a passageway, the passageway serving to duct a fluid to the forming area which facilitates the forming of said serpentine product, said passageway extending from said valley to said hollow inner region.

2. The tool of claim 1 further comprising a piping assembly for transferring said fluid to said hollow inner region and conveying said fluid through said passageway out of said groove and to said forming surface for use in the forming process.

3. The tool of claim 1, wherein each of said blades has an inner surface that forms a generally circular periphery to define said hollow inner region.

4. The tool of claim 1 wherein each of said plurality of teeth has a valley and wherein a groove is formed in each of said valleys.

5. The tool of claim 1 wherein each of said plurality of blades has a first peripheral edge and a peripheral second edge.

6. The tool of claim 1, further comprising an arcuate opening at the inlet to said passageway for conveying said fluid to said grooves and into contact with said forming surface.

7. The tool of claim 1, wherein said deformable, resilient products are fins for use in a heat exchanger.

8. The tool of claim 2, wherein said piping assembly further comprises a pair of rotatable shafts that convey said fluid to said hollow inner region and into contact with said forming surface.

9. The tool of claim 5 wherein said groove is formed in said valley on said first peripheral edge of said one or more blades.

10. The tool of claim 5 wherein said groove is formed in said valley on said second peripheral edge of said one or more blades.

11. A method of delivering fluids to a tool used for forming louvered serpentine fins comprising the steps of:
    providing a pair of rotatable wheel assemblies each having a plurality of blades, each of said blades having a hollow inner region and an outer surface,
    providing a plurality of grooves on said outer surface of at least one of said plurality of blades;
    providing a plurality of forming surfaces on said outer surface of said at least one of said plurality of blades; and
    transferring a fluid to said hollow inner region of one of said plurality of blades for conveying said fluid to said grooves for facilitating preparation of a work product being formed.

12. The method of claim 11, wherein the transferring step comprises transferring a lubricant to said hollow inner region.

13. The method of claim 11, wherein the transferring step comprises transferring a heating medium to said hollow inner region.

14. The method of claim 11, wherein the transferring step comprises transferring a cooling medium to said hollow inner region.

15. The method of claim 11, wherein the transferring step comprises transferring a layer for coating said work product to said hollow inner region.

16. A form roll used in the formation of a deformable, resilient serpentine product comprising:
    at least one blade, said at least one blade having a generally hollow inner region;
    at least one tooth formed on the periphery of said blade;
    a pair of forming surfaces extending generally inwardly from said at least one tooth;
    a hollow tube located within said hollow inner region for conveying a fluid thereto;
    a passageway in communication with said hollow tube; and
    a groove formed on said tooth in communication with said passageway for expelling said fluid onto a workpiece.

17. The form roll of claim 16, wherein said at least one blade includes a plurality of teeth uniformly spaced about the periphery of said blade.

18. The form roll of claim 16 further including a valley at the junction of each two inwardly extending forming surfaces.

19. The form roll of claim 17, wherein said groove is formed in said valley.

20. The form roll of claim 18, wherein said at least one blade includes an arcuate opening in communication with said passageway and formed at the outer periphery of said generally hollow inner region.

21. The form roll of claim 19 wherein said fluid is forced through said hollow tube and said passageway by air pressure.

* * * * *